United States Patent
Cooper

(10) Patent No.: US 8,328,460 B2
(45) Date of Patent: Dec. 11, 2012

(54) FASTENER AND FASTENER ASSEMBLY

(75) Inventor: Joseph B. Cooper, Brize Norton (GB)

(73) Assignee: Rolls-Royce PLC, London (GB)

( * ) Notice: Subject to any disclaimer, the term of this patent is extended or adjusted under 35 U.S.C. 154(b) by 18 days.

(21) Appl. No.: 13/022,134

(22) Filed: Feb. 7, 2011

(65) Prior Publication Data

US 2011/0206454 A1   Aug. 25, 2011

(30) Foreign Application Priority Data

Feb. 22, 2010   (GB) .................................. 1002955.1

(51) Int. Cl.
  *F16N 21/00*   (2006.01)
(52) U.S. Cl. .................... 403/348; 403/213; 411/349
(58) Field of Classification Search .......... 403/257–261, 403/213, 208, 252, 348, 375, 408.1; 411/349, 411/359
  See application file for complete search history.

(56) References Cited

U.S. PATENT DOCUMENTS

| | | | | |
|---|---|---|---|---|
| 1,771,167 A * | 7/1930 | Dolan | ............................ | 138/160 |
| 3,119,472 A * | 1/1964 | McLeod | .................... | 403/408.1 |
| 3,545,626 A * | 12/1970 | Seiz | ............... | 211/192 |
| 3,724,886 A | 4/1973 | Widerby | | |
| 4,231,675 A * | 11/1980 | Scozzafava | .................... | 403/252 |
| 4,349,171 A * | 9/1982 | Baldwin | ........................ | 248/243 |
| 4,536,904 A * | 8/1985 | Whitehead | ........................ | 5/201 |
| 4,878,640 A * | 11/1989 | Fricker et al. | ............. | 248/297.21 |
| 4,904,110 A * | 2/1990 | Klein | ........................ | 403/379.3 |
| 5,897,278 A * | 4/1999 | Frattarola | ..................... | 411/549 |
| 6,510,955 B2 * | 1/2003 | Pellegrino | ..................... | 211/192 |
| 7,137,768 B2 * | 11/2006 | Maas | ............................. | 411/553 |
| 7,581,794 B1 * | 9/2009 | Milow | .................... | 301/37.102 |
| 7,997,841 B2 * | 8/2011 | Show et al. | .................... | 411/349 |

FOREIGN PATENT DOCUMENTS

EP   1 236 911 A1   9/2002

OTHER PUBLICATIONS

Search Report issued in British Application No. GB 1002955.1 dated Apr. 26, 2010.

* cited by examiner

*Primary Examiner* — Joshua Kennedy
(74) *Attorney, Agent, or Firm* — Oliff & Berridge, PLC

(57) ABSTRACT

A fastener for securing together two sheet like members where a blind fixing is required, and yet possessing high positional accuracy. The fastener comprises a shank with a transverse foot the end of which carries a locating pin adapted to be received into locating holes in the members to be joined. The fastener is assembled by passing the foot through an opening in one of the members positioned so that the locating pin may be inserted into the locating holes. The fastener is secured by tightening a retaining nut and washer on a threaded portion of the shank of the fastener.

9 Claims, 2 Drawing Sheets

FASTENER AND FASTENER ASSEMBLY

The invention concerns a fastener, in particular means for securing together two metal panels in a predetermined relationship. The invention is especially useful for making blind fixings, that is where a joint is accessible from one side only.

Pinned joints are used where accurate assembly is required, for example as shown herein for assembling shield duct sections or the like. Where the components are thicker and come together at a flanged joint a plurality of alignment pins may be fitted into a counter bore on one of the component flanges to mate with receiving holes on a facing flange of the other component. With the abutting flanges aligned the joint is secured by bolts. In assembling a basic bolted joint access is required to both sides of the joint, but in situations where this is not available a captive nut or threaded stud can be used to replace a free nut or bolt respectively.

In the case of sheet materials a conventional fixing such as a rivet or bolt and anchor nut are used where only access to one side is available during assembly. Blind rivets can be installed by aligning holes in the two sheets, passing the head of the rivet through both holes and then deforming the rivet to squeeze the sheets together. However, riveted joints can be difficult to dismantle, compared to a bolted joint, and in order to produce an acceptable joint the parts to be riveted need to be secured together before riveting. Also, although it is possible to disassemble rivet joints this is usually only possible by destroying the rivet and has the disadvantage of depositing debris in the enclosed space. A simple bolt and anchor nut required space within the enclosed space as well as space and access to the interior. Captive nuts still occupy interior space and can lead to difficulty in sealing the joint.

The present invention is intended to provide a solution to these problems by providing a fastener capable of use where a blind fastener assembly is required and yet possesses minimum incursion into the interior volume.

According to one aspect of the present invention there is provided a fastener for securing together two sheet like members in partially overlapping relationship defined by alignment of locating holes, the fastener comprises a shank portion and has a transverse elongated foot which at its distal end carries locating means, and retaining means for securing the fastener to the sheet members wherein in use a first of the members is formed with an opening capable of receiving the foot and the second member has means for engaging the locating means at the distal end of the foot such that when the foot is inserted through the opening, the locating means is engaged and the retaining means made fast the members are secured together.

According to another aspect of the invention there is also provided a fastener assembly comprising first and second sheets held together in partial overlapping relationship by at least one fastening device as claimed in any one of the preceding claims, a first of the sheets having an opening therein adjacent the region of overlap and both sheets having locating holes formed such that the holes are co-axial when the sheets are correctly aligned, and the assembly being held in position by the at least one fastening device in which the foot of the fastener is inserted through the opening in the first sheet, and the locating pin carried at the distal end of the foot is engaged with both of the locating holes in the sheets, and a cover plate is mounted on and secured to the fastener covering the locating holes, The invention will now be further described with reference to the accompanying drawings, in which:

Figure 1:
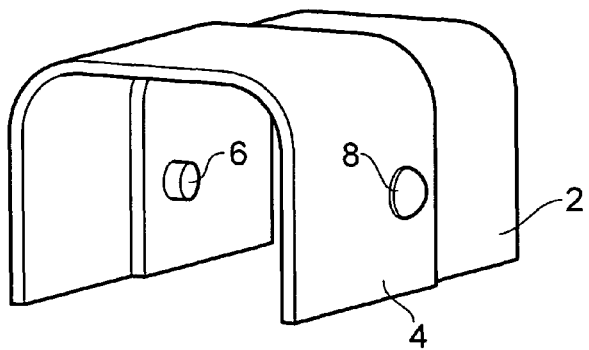
FIG. 1 illustrates a part cutaway view of a riveted joint between adjacent sections of an elongate shield cover according to the prior art.
Figure 2:
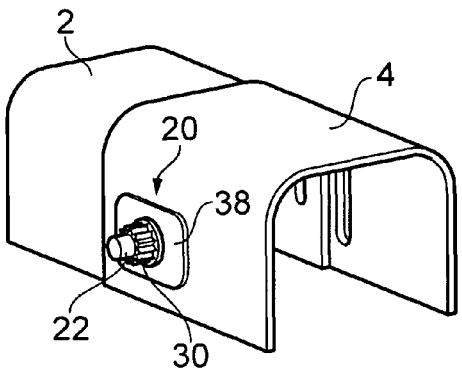
FIG. 2 illustrates a view of the joint of FIG. 1 modified to incorporate a fastener according to the invention.
Figure 3:
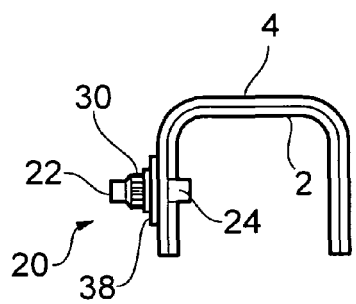
FIG. 3 is an axial view of the joint of FIG. 2 showing the extent of intrusion of the fastener.
Figure 4:
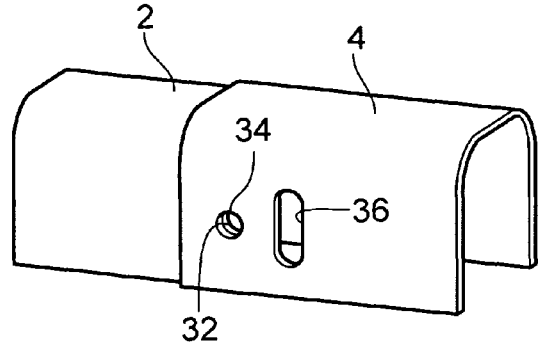
FIG. 4 shows how the shield cover components of FIG. 2 are adapted to receive the fastener of the invention.
Figure 5:
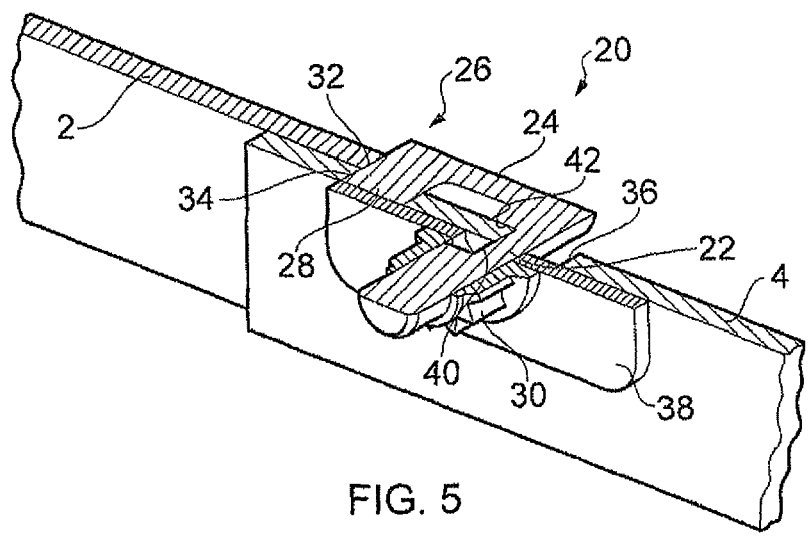
FIG. 5 shows a cutaway section through the fastener to illustrate its construction and assembly.

Referring now to FIG. 1 of the accompanying drawings there is illustrated a prior art method of securing together lengths of channel or shield sections indicated at 2,4 as referred to above is illustrated in the first figure of the drawings at FIG. 1. The shield sections 2,4 comprise lengths of metal sheet cut and folded to form the desired internal channel section. In the form illustrated both lengths are of inverted "U" section but they could be closed and even have an annular cross-section (not shown) thus preventing access to the interior. In this example the members are secured together by means of blind rivets 6,8 driven into holes formed in the sides of the members 2, 4. The joint is to be formed by overlapping one end of member 2 with the adjacent end of member 4. The internal dimensions of member 4 is increased to accommodate the external dimensions of member 2 so that one fits over the other. Holes 10, 12 formed at predetermined positions in the two members are aligned and the joint is then formed by securing the two members 2, 4 together by passing the heads of the rivets rivets 6, 8 through the holes and deforming the rivets, thus squeezing the members together. Alternatively, bolt and anchor nut fixings could be used instead of the rivets where the captive nuts are attached to the inside of the inner member at a joint and the bolt is wound through the external member. However, both types of fixings suffer drawbacks.

Rivets can be more difficult to assemble compared to bolted joints. The members to be fastened together must first be held in alignment before rivets can be installed. On the other hand anchor or captive nuts take up interior space and where space is limited there may not be sufficient room.

The present invention is intended to overcome these drawbacks by providing a fastener that can be installed from one side, is itself capable of holding the members in alignment while the joint is secured and is releasable.

A fastener according to the invention for securing together two sheet like members 2,4 is illustrated by FIGS. 2 to 5 of the drawings. The fastener is indicated generally at 20 in FIGS. 2 and 3 and in more detail in FIG. 5. The fastener comprises a shank portion 22 which at one end is formed integrally with a transverse elongated foot 24. The distal end 26 of the foot 24 carries locating means in the form of an upstanding pin 28. The shank 22, foot 24 and pin 28 have the shape an an "L" in section. The shank 22 has a screw thread cut on its external surface over a substantial part of its length to receive a retaining nut 30, and together form a retaining means for securing the fastener 20 to the sheet members 2,4.

The members 2, 4 have formed in them alignment holes 32, 34 both to the same diameter and to a tight tolerance with respect to the diameter of the locating pin 28 on the foot 24 of the fastener. Alignment hole 32 is spaced from the edge of member 2 by not more than the length of fastener foot 24. Also formed in member 4 is a slot 36 spaced about the same distance towards the centre part of member 4. As may be seen best in FIGS. 3 and 4 the slot 36 is elongate so that the foot 24 of the fastener may pass therethrough. Preferably the long dimension of slot 36 is oriented at a right angle to an imaginary line joining the centre of alignment hole 34 and the centre of the slot. The height of locating pin 28 is sufficient when the assembly is put together to protrude through the thickness of member 4 into engagement with hole 34 in member 4. To engage the locating pin 28 with the holes 32,34 the foot 24 of the fastener is passed through the slot 36 and the fastener is turned a quarter turn. The retaining nut 30 is then tightened to secure the joint.

Preferably in order to seal the joint the assembly includes a locking plate 38 which is preferably merely a plain plate having an aperture adapted to receive the shank 22 of the fastener and to be secured in position by the retaining means. The diameter of the aperture provides a clearance around the shank of the fastener and the external dimensions of the plate are sufficient to cover the locating hole 34 in the surface of member 4. Preferably, during assembly of the joint and fastener the locking plate 38 and retaining nut 30 are assembled onto the shank of the fastener before the foot of the fastener is offered up to the slot 36, thus preventing loss of the fastener inside the space enclosed by the members 2,4.

In a preferred form of the invention the fastener 22 has a section 40 of reduced lateral dimension thereby forming a shoulder 42 adjacent the foot on the side of the shank facing towards the distal end 26 of the foot 24. When the fastener is turned through a quarter turn to engage locating pin 28 in the locating holes 32,34 the shoulder 42 engages the inner surface of member 2 adjacent the opening. When retaining nut 30 is wound down the shank of the fastener the assembly is locked in position.

Figure 6:
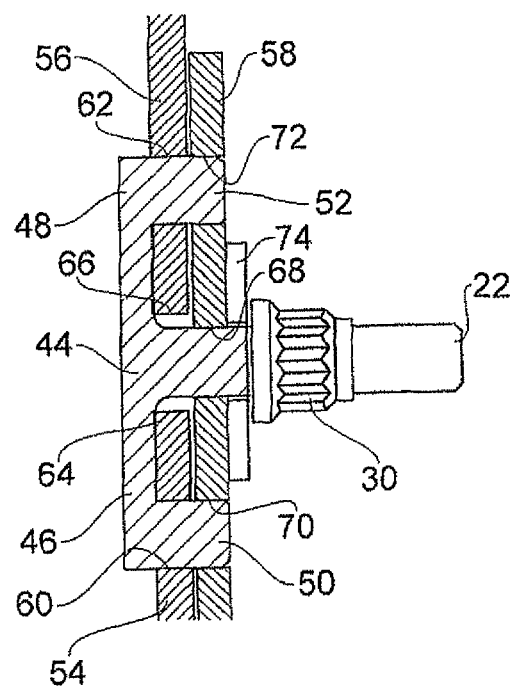
FIG. 6 illustrates also in cutaway section a modified example of a fastener according to the invention.

FIG. 6 shows a modified form of the fastener of the present invention in which the shank 22 carries a transverse elongate foot 44 comprising a pair of opposed, laterally extending arms 46,48 each of which has locating means 50, 52 at either end. This form of the fastener is adapted to secure a joint between abutting edges of two sheet-like members 54,56 together with a bridging shield member 58. In this arrangement locating holes 60, 62 are formed towards the adjacent edges 64,66 of members 54,56 to receive the pins 50,52 respectively. The edges 64,66 are spaced apart by a narrow gap through which the shank 22 of the fastener passes. In order to brace the joint and to bridge the gap a third member 58 is provided with an aperture 68 therein adapted to receive the fastener shank 22 and locating holes 70,72 for locating pins 50,52.

The principle operation of the fastener and method of assembly is essentially as described above. The foot of the fastener is inserted through the gap between the member edges 64,66 and is turned a quarter turn to engage the pins 50,52 with their respective locating holes in the three members 54,56,58. The fastener is then tightened and secured using a washer or plate 74 fitted around the shank 22 and a retaining nut 30.

This modified form of the invention dispenses with the waisted portion of the shank 22 required to provide a locking shoulder in the arrangement of FIGS. 2 to 5. In theory therefore the modified fastener can be tightened to a higher torque than the first described arrangement.

The invention claimed is:

1. A fastener assembly comprising:
a first sheet member having a locating hole;
a second sheet member having a locating hole; and
a fastener, wherein, when fastened, the first sheet member and the second sheet member are secured in partially overlapping relationship defined by alignment of the locating holes of the first and second sheet members, the fastener comprising:
a shank portion;
a transverse elongated foot that, at its distal end, carries a locating means; and
a retaining means for securing the fastener to the first and second sheet members, wherein
the first sheet member is formed with an elongate opening capable of receiving the foot, and the locating hole of the second sheet member engages the locating means at the distal end of the foot such that, when the foot is inserted through the elongate opening, the locating means is engaged, the retaining means is fastened, and the first and second sheet members are secured together, wherein
the locating hole of the first sheet member and the elongate opening of the first sheet member are spaced apart, the elongate opening having a long dimension oriented perpendicular to an imaginary line joining a center of the locating hole in the first sheet member and a center of the elongate opening, such that the shank of the fastener is turned approximately a quarter turn to engage the locating means.

2. The fastener assembly of claim 1, wherein the locating means comprises a locating pin towards the distal end of the foot the locating hole in either of the first and second sheet members adapted to receive the locating pin co-axially therethrough when the first and second sheet members are correctly aligned.

3. The fastener assembly of claim 1, further comprising a plate for closing the elongate opening in the first sheet member through which the foot of the fastener is inserted, the plate having an aperture adapted to receive the shank and to be secured in position by the retaining means.

4. The fastener assembly of claim 1, wherein the retaining means comprises a screw thread portion on the projecting part of the shank, and a co-operating nut.

5. The fastener assembly of claim 1, wherein the transverse elongate foot comprises a pair of opposed, laterally extending arms with the locating means at either end.

6. The fastener assembly of claim 1, wherein the shank of the fastener includes a portion forming a shoulder adjacent the foot to engage an inner face of the first sheet member adjacent the elongate opening.

7. The fastener assembly of claim 1, further comprising a cover plate mounted on and secured to the fastener, and covering the locating holes of the first and second sheet members.

8. The fastener assembly of claim 7, wherein the dimensions of the elongate opening are selected to receive therethrough the foot and the shank of the fastener.

9. The fastener assembly of claim 8, wherein a width of the elongate opening is such that when the fastener is turned to engage the locating pin, a shoulder on the shank engages a face of the first sheet member alongside the elongate opening.

* * * * *